(12) United States Patent
Chen

(10) Patent No.: US 10,104,545 B2
(45) Date of Patent: Oct. 16, 2018

(54) COMPUTER-IMPLEMENTED ANONYMITY AUTHENTICATION METHOD FOR WIRELESS SENSOR NETWORKS

(71) Applicant: NATIONAL CHIN-YI UNIVERSITY OF TECHNOLOGY, Taichung (TW)

(72) Inventor: Chi-Tung Chen, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 0 days.

(21) Appl. No.: 15/342,113

(22) Filed: Nov. 2, 2016

(65) Prior Publication Data

US 2018/0124600 A1 May 3, 2018

(51) Int. Cl.
| | |
|---|---|
| H04L 9/32 | (2006.01) |
| H04W 12/06 | (2009.01) |
| H04L 29/06 | (2006.01) |
| H04L 9/06 | (2006.01) |
| H04L 9/08 | (2006.01) |

(52) U.S. Cl.
CPC ........... *H04W 12/06* (2013.01); *H04L 9/0643* (2013.01); *H04L 9/0838* (2013.01); *H04L 63/0421* (2013.01); *H04L 63/0846* (2013.01); *H04L 63/0853* (2013.01); *H04L 2209/805* (2013.01)

(58) Field of Classification Search
CPC .... H04W 12/06; H04L 9/0643; H04L 9/0838; H04L 63/0421; H04L 63/0846; H04L 63/0853
See application file for complete search history.

(56) References Cited

U.S. PATENT DOCUMENTS

| | | | | |
|---|---|---|---|---|
| 7,234,059 | B1 * | 6/2007 | Beaver ................... | H04L 9/0833 380/283 |
| 7,987,368 | B2 * | 7/2011 | Zhu ....................... | H04L 63/0407 713/156 |
| 8,464,058 | B1 * | 6/2013 | Chen ...................... | H04L 9/0844 380/284 |
| 8,707,046 | B2 * | 4/2014 | Walker ................... | H04L 9/0844 713/150 |
| 9,021,265 | B1 * | 4/2015 | Chen ...................... | H04L 9/0844 713/169 |
| 2006/0059344 | A1 * | 3/2006 | Mononen ............... | H04L 63/061 713/171 |
| 2011/0154022 | A1 * | 6/2011 | Cheng .................... | H04W 4/70 713/154 |
| 2014/0087790 | A1 * | 3/2014 | Babbage ................ | H04W 8/183 455/558 |
| 2014/0201809 | A1 * | 7/2014 | Choyi .................... | H04L 63/0807 726/3 |

FOREIGN PATENT DOCUMENTS

KR 10138498 B1 * 10/2011

* cited by examiner

*Primary Examiner* — John B King
*Assistant Examiner* — Darshan Dhruv
(74) *Attorney, Agent, or Firm* — CKC & Partners Co., Ltd.

(57) ABSTRACT

An anonymity authentication method for wireless sensor networks is provided. A smart card carried by a user is used to provide two-factor verification protection. Moreover, a random factor and a hash function operation are introduced for participating an operation of the transmitted messages in all phases. Moreover, the operation of the transmitted messages uses only hash function and XOR operator.

4 Claims, 5 Drawing Sheets

COMPUTER-IMPLEMENTED ANONYMITY AUTHENTICATION METHOD FOR WIRELESS SENSOR NETWORKS

BACKGROUND

Technical Field

The present disclosure relates to an anonymity authentication method on a network environment. More particularly, the present disclosure relates to an anonymity authentication method for wireless sensor networks.

Description of Related Art

Wireless sensor networks include many sensor nodes distributed in the space. Each of the sensor nodes is cooperated with each other to monitor different physical or environmental situations (temperature, sound, vibration, pressure, activity or pollution, etc.) at different locations. A user can obtain the sensing data through accessing the sensor nodes. The wireless sensor networks have been widely applied in many fields such as environmental and ecological monitoring, health monitoring, household automation and traffic control, etc.

Due to the wireless transmission of the wireless sensor networks, the communication messages are easily exposed and monitored. The open environment of the wireless sensor networks is also easily attacked such as DoS, gateway masquerade, sensor node masquerade, etc. Furthermore, for blocking the aforementioned attacks, conventional methods commonly use complicated algorithms, thereby causing low computational efficiency.

Accordingly, there is a need to develop an authentication method for the wireless sensor networks that has high efficiency, high effectiveness and high security.

SUMMARY

According to one aspect of the present disclosure, an anonymity authentication method for wireless sensor networks is provided. The anonymity authentication method includes a registration procedure, a login procedure and an authentication and key agreement procedure. The registration procedure includes a user registration procedure and a sensor node registration procedure.

The user registration procedure includes:
freely choosing a user identification $ID_i$ and a user password $PW_i$ by a user;
generating a random number $r_i$ and computing $h(r_i \oplus PW_i)$ by the user, where $h(.)$ is a single hash function operation;
transmitting the user identification $ID_i$ and $h(r_i \oplus PW_i)$ to a gateway node by the user through a security channel;
selecting an expiration time $TE_i$ of a temporal credential $TC_i$ of the user and computing: $P_i=h(ID_i\|ID_{GWN}\|TE_i)$, $TC_i=h(P_i\|K_{GWN-U}\|TE_i)$, $PTC_i=TC_i \oplus h(r_i \oplus PW_i)$, $Q_i=h(ID_i\|K_{GWN-U})$, $B_i=Q_i \oplus h(ID_i\|h(r_i \oplus PW_i))$ and $R_i=h(Q_i)$ by the gateway node, and issuing the temporal credential $TC_i$ for the user after receiving the messages transmitted by the user, where $\|$ is a string concatenation operation and $\oplus$ is an XOR operation;
issuing a secret parameter set $\{ID_{GWN}, PTC_i, TE_i, B_i, R_i, h(.)\}$ to a smart card of the user by the gateway node through a security channel; and
inputting the random number $r_i$ to the smart card of the user, and the smart card including the secret parameter set $\{ID_{GWN}, PTC_i, TE_i, B_i, R_i, r_i, h(.)\}$.

The sensor node registration procedure includes:
pre-configuring a sensor node with a sensor node identification $SID_j$;
generating a random number $r_j$ and computing $h(r_j \oplus SID_j)$ by the sensor node;
transmitting the sensor node identification $SID_j$ and $h(r_j \oplus SID_j)$ to the gateway node by the sensor node through a security channel;
computing a temporal credential $TC_j=h(K_{GWN-S}\|SID_j)$ and issuing the temporal credential $TC_j$ for the sensor node by the gateway node after receiving the messages transmitted from the sensor node;
computing $RTC_j=TC_j \oplus h(h(r_j \oplus SID_j)\|SID_j)$ and transmitting $RTC_j$ to the sensor node by the gateway node through a security channel; and
computing the temporal credential $TC_j=RTC_j \oplus h(h(r_j \oplus SID_j)\|SID_j)$ then storing $TC_j$ by the sensor node after receiving the messages transmitted from the gateway node.

The login procedure includes:
inserting the smart card into a card reader by the user and providing the user identification $ID_i$ and the user password $PW_i$ corresponding to the smart card;
computing $Q_i=B_i \oplus h(ID_i\|h(r_i \oplus PW_i))$ and $R_i^*=h(Q_i)$ by the smart card, and verifying whether $R_i^*$ and stored $R_i$ in the smart card are equal; if the values are unequal, the smart card rejecting the login procedure; if the values are equal, the legitimacy of the user is ensured, and the messages stored in the smart card can be read by the user; and
computing the temporal credential $TC_i=PTC_i \oplus h(r_i \oplus PW_i)$ by the user to find its temporal credential $TC_i$.

The authentication and key agreement procedure includes:
generating a random number $N_i$ and computing: $P_i=h(ID_i\|ID_{GWN}\|TE_i)$, $DID_i=ID_i \oplus h(TC_i\|ID_{GWN}\|N_i)$ and $q_1=h(ID_i\|TC_i\|N_i)$ by the user;
randomly choosing a secret sharing key $K_i$, and computing $PKS_i=K_i \oplus h(TC_i\|N_i)$ by the user; after computation, transmitting a login request message $m_1=\{DID_i, q_1, PKS_i, TE_i, P_i, N_i\}$ to the gateway node by the user; computing $TC_i=h(P_i\|K_{GWN-U}\|TE_i)$, $ID_i=DID_i \oplus h(TC_i\|ID_{GWN}\|N_i)$ and $q_1^*=h(ID_i\|TC_i\|N_i)$ by the gateway node after receiving the login request message;
verifying whether $q_1^*$ and $q_1$ are equal by the gateway node; if $q_1^* \neq q_1$, terminating the login request of the user and transmitting a rejection message to the user by the gateway node; if $q_1^*=q_1$, the legitimacy of the user is ensured, and the login request of the user is accepted by the gateway node and a login status of the user is recorded by the gateway node;
computing $K_i=PKS_i \oplus h(TC_i\|N_i)$ by the gateway node; at the time, choosing a nearby suitable sensor node as the accessed sensor node with the sensor node identification $SID_j$ and computing the temporal credential $TC_j=h(K_{GWN-S}\|SID_j)$ by the gateway node;
generating a random number $N_{GWN}$ and computing $DID_{GWN}=ID_i \oplus h(TC_j\|DID_i\|N_{GWN})$, $q_2=h(ID_i\|TC_j\|N_{GWN})$ and $PKS_{GWN}=K_i \oplus h(TC_j\|N_{GWN})$ by the gateway node;
after computation, transmitting a message set $m_2=\{DID_i, DID_{GWN}, q_2, PKS_{GWN}, ID_{GWN}, N_i, N_{GWN}\}$ to the sensor node by the gateway node;
after receiving the message set $m_2$, assessing the gateway node identification $ID_{GWN}$ to determine whether the gateway node is an ally, if yes, then computing $ID_i=DID_{GWN} \oplus h(TC_j\|DID_i\|N_{GWN})$ and $q_2^*=h(ID_i\|TC_j\|N_{GWN})$ by the sensor node;

verifying whether $q_2^*$ and $q_2$ are equal by the sensor node, if $q_2^* \neq q_2$, terminating the request and returning a rejection message by the sensor node; if $q_2^* = q_2$, the legitimacy of the gateway node is ensured, and the request is accepted by the sensor node;

at the time, computing $K_i = PKS_{GWN} \oplus h(TC_j \| N_{GWN})$ by the sensor node;

freely choosing a secret sharing key $K_j$ and computing $q_3 = h(ID_i \| SID_j \| K_i \| N_i \| N_{GWN})$ and $PKS_j = K_j \oplus h(K_i \| N_i \| N_{GWN})$ by the sensor node;

transmitting a message set $m_3 = \{SID_j, q_3, PKS_j, N_i, N_{GWN}\}$ to the user and the gateway node by the sensor node;

after receiving the message set $m_3$, the user and the gateway node computing $q_3^* = h(ID_i \| SID_j \| K_i \| N_i \| N_{GWN})$ separately;

after computation, verifying whether $q_3^*$ and $q_3$ are equal by the gateway node; if $q_3^* = q_3$, the legitimacy of the sensor node is ensured by the gateway node;

similarly, verifying whether $q_3^*$ and $q_3$ are equal by the user, if $q_3^* = q_3$, the legitimacy of the sensor node and the gateway node is ensured by the user;

the user and the gateway node computing the secret sharing key $K_j = PKS_j \oplus h(K_i \| N_i \| N_{GWN})$ separately;

after the authentication procedure, the user, the gateway node and the sensor node computing a shared secret session key $KEY_{ij} = h(K_i \| K_j \| N_i \| N_{GWN} \| SID_j)$ separately. Wherein $P_i$, $PTC_i$, $Q_i$, $B_i$, $R_i$, $RTC_j$, $PKS_i$, $PKS_{GWN}$, $PKS_j$, $q_1^*$, $q_1$, $q_2^*$, $q_2$, $q_3^*$, $q_3$, $R_i$, $R_i^*$ are computation values.

BRIEF DESCRIPTION OF THE DRAWINGS

The present disclosure can be more fully understood by reading the following detailed description of the embodiment, with reference made to the accompanying drawings as follows.

DETAILED DESCRIPTION

It is a purpose of the present disclosure to provide an anonymity authentication method for wireless sensor networks. In the anonymity authentication method, high security will be achieved through the smart card carried by the user. In a registration procedure, a login procedure and an authentication and key agreement procedure, the transmitted messages are encrypted by random numbers; therefore anonymity functionality can be achieved. Furthermore, all operations are performed by combining a simple hash function and XOR operator; therefore, high computational efficiency and low energy consumption can be achieved thereby reducing the system cost.

For more clearly understanding the present disclosure, it should be mentioned that different computation values may be corresponded to the same operation. This is due to the same operation may be performed by different participants, and different participants will obtain different computation values $P_i$, $PTC_i$, $Q_i$, $B_i$, $R_i$, $RTC_j$, $PKS_i$, $PKS_{GWN}$, $PKS_j$, $q_1^*$, $q_1$, $q_2^*$, $q_2$, $q_3^*$, $q_3$, $R_i$, $R_i^*$. Furthermore, different computation values are used between them for the mutual authentication.

An anonymity authentication method for wireless sensor networks is provided in the present disclosure. In wireless sensor networks, three participants are participated, they are a user $U_i$, a sensor node $S_j$ and a gateway node GWN. The anonymity authentication method for wireless sensor networks of the present disclosure includes a registration procedure, a login procedure and an authentication and key agreement procedure. A password changing procedure is also included if required.

Figure 1:
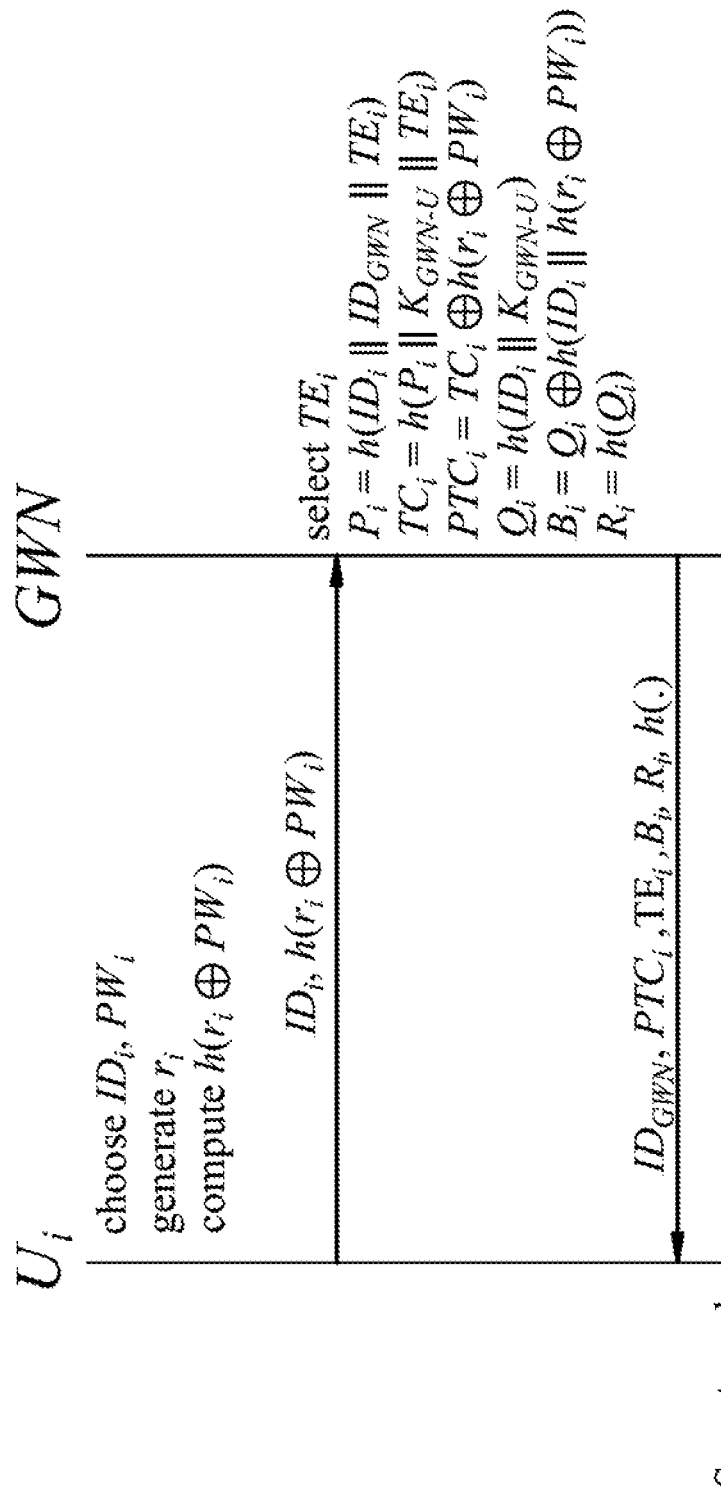
FIG. 1 is a schematic diagram showing a user registration procedure of an anonymity authentication method for wireless sensor networks according to one embodiment of the present disclosure.
Figure 2:
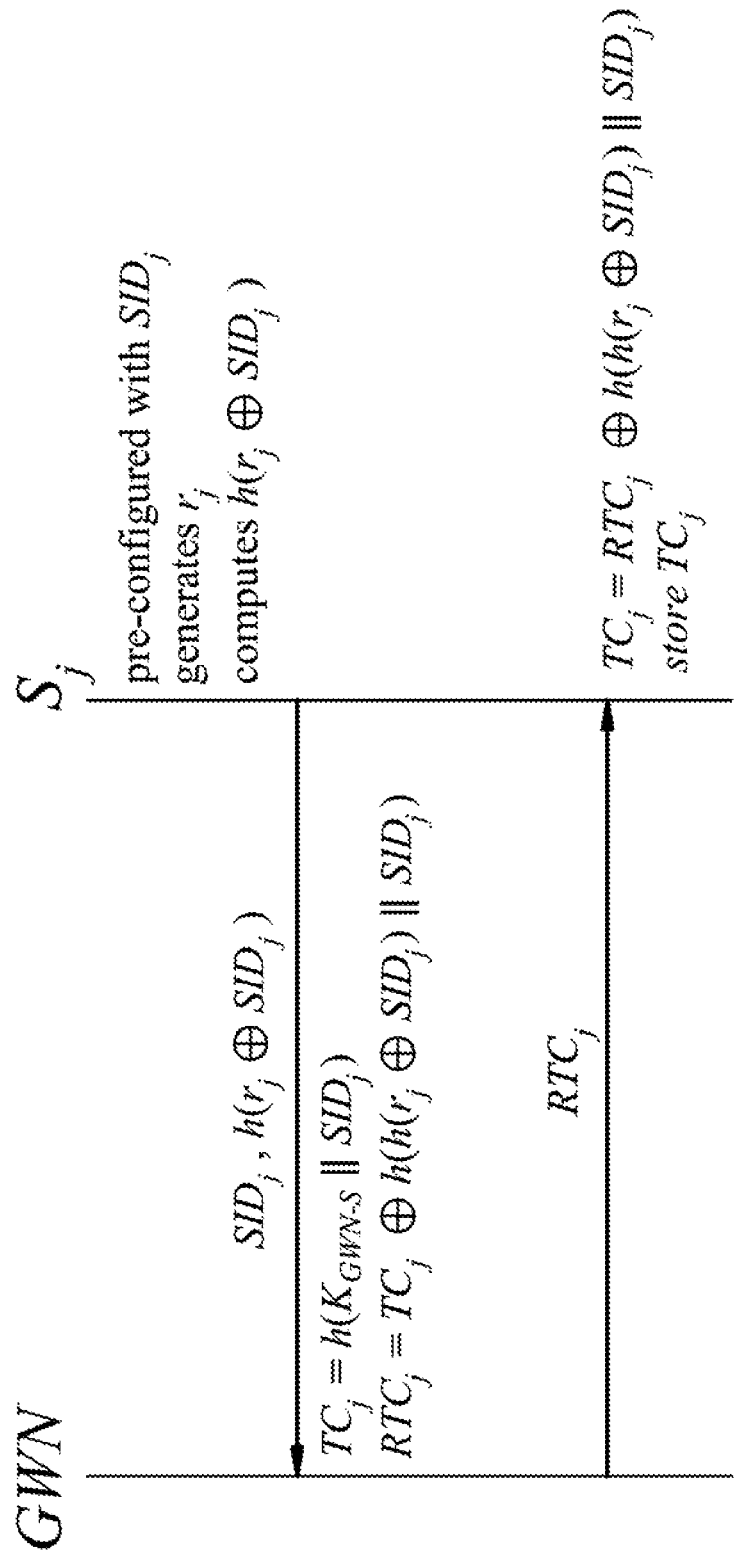
FIG. 2 is a schematic diagram showing a sensor node registration procedure of the anonymity authentication method for wireless sensor networks according to one embodiment of the present disclosure.
Figure 3A:
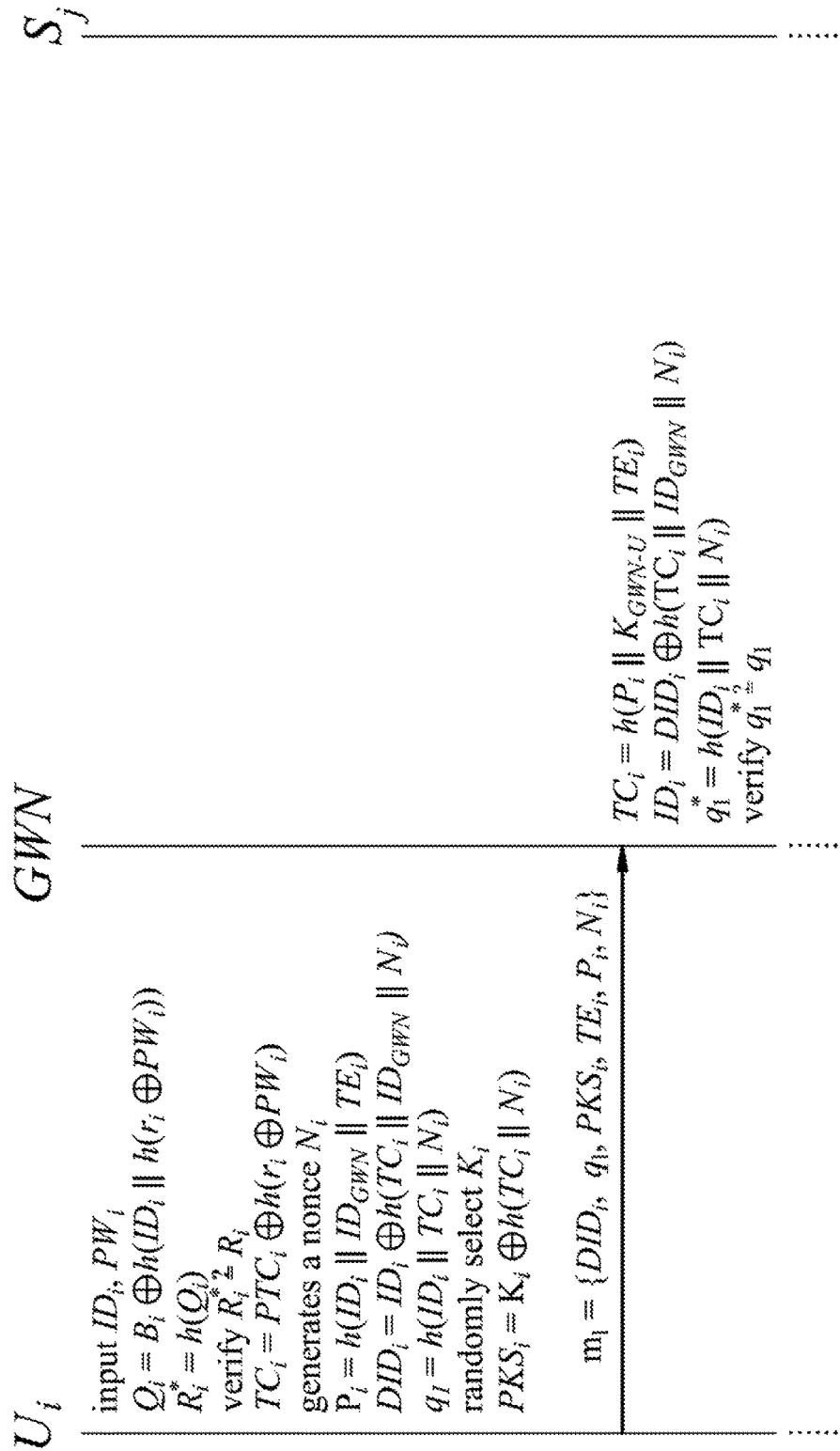
FIG. 3A is a schematic diagram showing a login procedure and an authentication and key agreement procedure of the anonymity authentication method for wireless sensor networks according to one embodiment of the present disclosure.
Figure 3B:
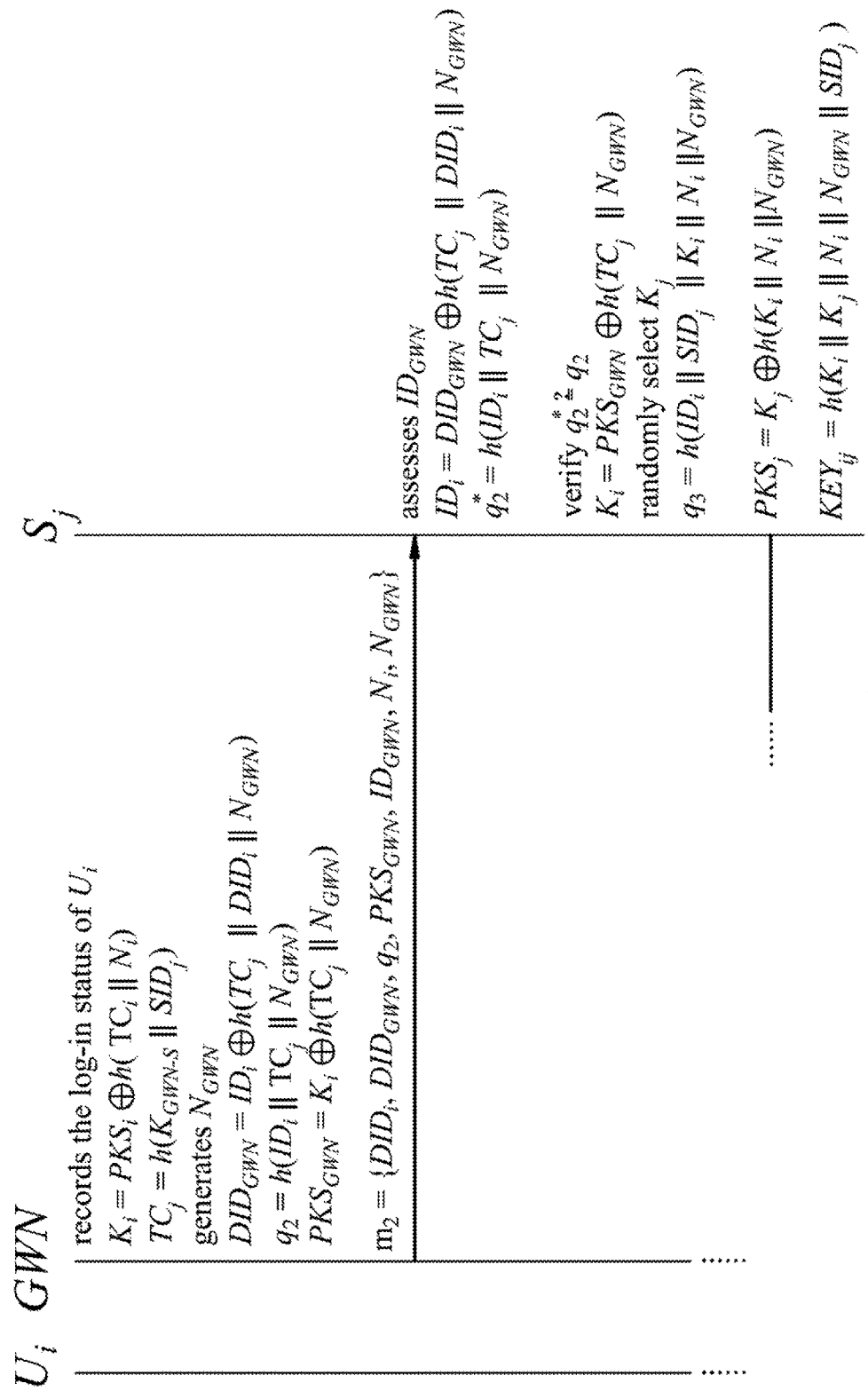
FIG. 3B is a continued schematic diagram showing the login procedure and the authentication and key agreement procedure of the anonymity authentication method for wireless sensor networks of FIG. 3A.
Figure 3C:
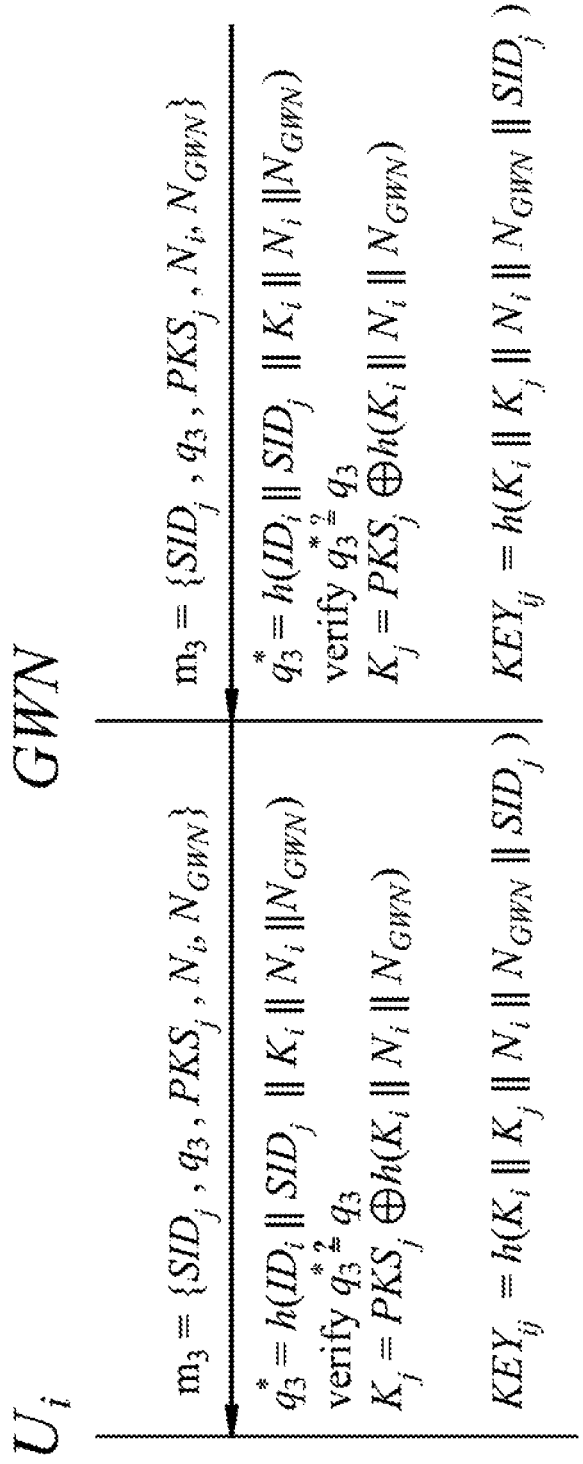
FIG. 3C is a continued schematic diagram showing the login procedure and the authentication and key agreement procedure of the anonymity authentication method for wireless sensor networks of FIG. 3B.

The registration procedure includes two parts: a user $U_i$ registration procedure and a sensor node $S_j$ registration procedure. The user $U_i$ registration procedure is shown in FIG. 1 and the sensor node registration procedure $S_j$ is shown in FIG. 2.

The user $U_i$ registration procedure includes the following steps.

The user $U_i$ freely choses a user identification $ID_i$ and a user password $PW_i$.

The user $U_i$ generates a random number $r_i$ and computing $h(r_i \oplus PW_i)$, where $h(.)$ is a single hash function operation.

The user $U_i$ transmits the user identification $ID_i$ and $h(r_i \oplus PW_i)$ to a gateway node GWN through a security channel.

The gateway node GWN selects an expiration time $TE_i$ of a temporal credential $TC_i$ of the user $U_i$ and computes: $P_i = h(ID_i \| ID_{GWN} \| TE_i)$, $TC_i = h(P_i \| K_{GWN-U} \| TE_i)$, $PTC_i = TC_i \oplus h(r_i \oplus PW_i)$, $Q_i = h(ID_i \| K_{GWN-U})$, $B_i = Q_i \oplus h(ID_i \| h(r_i \oplus PW_i))$ and $R_i = h(Q_i)$, and issues the temporal credential $TC_i$ for the user $U_i$ after receiving the messages transmitted by the user Ui, where $\|$ is a string concatenation operation and $\oplus$ is an XOR operation.

The gateway node GWN issues a secret parameter set $\{ID_{GWN}, PTC_i, TE_i, B_i, R_i, h(.)\}$ to a smart card of the user $U_i$ through a security channel.

Inputs the random number $r_i$ to the smart card of the user $U_i$, and the smart card includes the secret parameter set $\{ID_{GWN}, PTC_i, TE_i, B_i, R_i, r_i, h(.)\}$.

The sensor node $S_j$ registration procedure is then described. The sensor node $S_j$ registration procedure includes the following steps.

The sensor node $S_j$ is pre-configured with a sensor node identification $SID_j$.

The sensor node $S_j$ generates a random number $r_j$ and computes $h(r_j \oplus SID_j)$.

The sensor node $S_j$ transmits the sensor node identification $SID_j$ and $h(r_j \oplus SID_j)$ to the gateway node GWN through a security channel.

The gateway node GWN computes a temporal credential $TC_j = h(K_{GWN-S} \| SID_j)$ and issues the temporal credential $TC_j$ for the sensor node $S_j$ after receiving the messages transmitted from the sensor node $S_j$.

The gateway node GWN computes $RTC_j = TC_j \oplus h(h(r_j \oplus SID_j) \| SID_j)$ and transmits $RTC_j$ to the sensor node $S_j$ through a security channel.

The sensor node $S_j$ computes the temporal credential $TC_j=RTC_j\oplus h(h(r_j\oplus SID_j)\|SID_j)$ to find the temporal credential $TC_j$ then stores $TC_j$ after receiving the messages transmitted from the gateway node GWN.

The login procedure includes the following steps.

The user $U_i$ inserts the smart card into a card reader and provides the user identification $ID_i$ and the user password $PW_i$ corresponding to the smart card.

The smart card computes $Q_i=B_i\oplus h(ID_i\|h(r_i\oplus PW_i))$ and $R_i^*=h(Q_i)$, and verifies whether $R_i^*$ and stored $R_i$ in the smart card are equal; if the values are unequal, the smart card rejects the login procedure; if the values are equal, the legitimacy of the user $U_i$ is ensured, and the messages stored in the smart card can be read by the user $U_i$.

The user $U_i$ computes the temporal credential $TC_i=PTC_i\oplus h(r_i\oplus PW_i)$ to find its temporal credential $TC_i$.

After the user $U_i$ obtaining its temporal credential $TC_i$, a mutual authentication procedure between the user $U_i$, the gateway GWN and the sensor node $S_j$ should be performed.

First, the user $U_i$ is authenticated by the gateway node GWN; and then the gateway node GWN is authenticated by the sensor node $S_j$; finally, the sensor node $S_j$ is authenticated by the user $U_i$ and the gateway node GWN. After performing the mutual authentication procedure, the user $U_i$ is agreed with the sensor node $S_j$, and a session key $KEY_{ij}$ is negotiated between the user $U_i$ and the sensor node $S_j$ to conduct encryption during messages transmission later on.

The aforementioned authentication and key agreement procedure includes the following steps.

The user $U_i$ generates a random number $N_i$ and computes: $P_i=h(ID_i\|ID_{GWN}\|TE_i)$, $DID_i=ID_i\oplus h(TC_i\|ID_{GWN}\|N_i)$ and $q_1=h(ID_i\|TC_i\|N_i)$.

The user $U_i$ randomly chooses a secret sharing key $K_i$, and computes $PKS_i=K_i\oplus h(TC_i\|N_i)$; after computation, the user $U_i$ transmits a login request message $m_1=\{DID_i, q_1, PKS_i, TE_i, P_i, N_i\}$ to the gateway node GWN; the gateway node GWN computes $TC_i=h(P_i\|K_{GWN-U}\|TE_i)$, $ID_i=DID_i\oplus h(TC_i\|ID_{GWN}\|N_i)$ and $q_1^*=h(ID_i\|TC_i\|N_i)$ after receiving the login request message.

The gateway node GWN verifies whether $q_1^*$ and $q_1$ are equal; if $q_1^*\neq q_1$, the gateway node GWN terminates the login request of the user $U_i$ and transmits a rejection message to the user $U_i$; if $q_1^*=q_1$, the legitimacy of the user $U_i$ is ensured, and the login request of the user $U_i$ is accepted by the gateway node GWN and a login status of the user $U_i$ is recorded by the gateway node GWN.

The gateway node GWN computes $K_i=PKS_i\oplus h(TC_i\|N_i)$; at the time, the gateway node GWN chooses a nearby suitable sensor node $S_j$ as the accessed sensor node $S_j$ with the sensor node identification $SID_j$ and computes the temporal credential $TC_j=h(K_{GWN-S}\|SID_j)$.

The gateway node GWN generates a random number $N_{GWN}$ and computes $DID_{GWN}=ID_i\oplus h(TC_j\|DID_i\|N_{GWN})$, $q_2=h(ID_i\|TC_j\|N_{GWN})$ and $PKS_{GWN}=K_i\oplus h(TC_j\|N_{GWN})$.

After computation, the gateway node GWN transmits a message set $m_2=\{DID_i, DID_{GWN}, q_2, PK_{SGWN}, ID_{GWN}, N_i, N_{GWN}\}$ to the sensor node $S_j$.

After receiving the message set $m_2$, the sensor node $S_j$ assesses the gateway node identification $ID_{GWN}$ to determine whether the gateway node GWN is an ally, if yes, then the gateway node GWN computes $ID_i=DID_{GWN}\oplus h(TC_j\|DID_i\|N_{GWN})$ and $q_2^*=h(ID_i\|TC_j\|N_{GWN})$.

The gateway node GWN verifies whether $q_2^*$ and $q_2$ are equal, if $q_2^*\neq q_2$, the sensor node $S_j$ terminates the request and returns a rejection message; if $q_2^*=q_2$, the legitimacy of the gateway node GWN is ensured, and the request is accepted by the sensor node $S_j$.

At the time, the sensor node $S_j$ computes $K_i=PKS_{GWN}\oplus h(TC_j\|N_{GWN})$.

The sensor node $S_j$ freely chooses a secret sharing key $K_j$ and computes $q_3=h(ID_i\|SID_j\|K_i\|N_i\|N_{GWN})$ and $PKS_j=K_j\oplus h(K_i\|N_i\|N_{GWN})$.

The sensor node $S_j$ transmits a message set $m_3=\{SID_j, q_3, PKS_j, N_i, N_{GWN}\}$ to the user $U_i$ and the gateway node GWN.

After receiving the message set $m_3$, the user $U_i$ and the gateway node GWN computes $q_3^*=h(ID_i\|SID_j\|K_i\|N_i\|N_{GWN})$ separately.

After computation, the gateway node GWN verifies whether $q_3^*$ and $q_3$ are equal; if $q_3^*=q_3$, the legitimacy of the sensor node $S_j$ is ensured by the gateway node GWN.

Similarly, the user $U_i$ verifies whether $q_3^*$ and $q_3$ are equal, if $q_3^*=q_3$, the legitimacy of the sensor node $S_j$ and the gateway node GWN is ensured.

The user $U_i$ and the gateway node GWN computes the secret sharing key $K_j=PKS_j\oplus h(K_i\|N_i\|N_{GWN})$ separately.

After the aforementioned authentication procedure, the user $U_i$, the gateway node GWN and the sensor node $S_j$ computes a shared secret session key $KEY_{ij}=h(K_i\|K_j\|N_i\|N_{GWN}\|SID_j)$ separately.

In a situation that the user $U_i$ wants to change a new password, the password changing procedure is performed. The password changing procedure includes the following steps.

The user $U_i$ inserts the smart card into the card reader and provides the user identification $ID_i$ and the user password $PW_i$.

The smart card of the user $U_i$ computes $Q_i=B_i\oplus h(ID_i\|h(r_i\oplus PW_i))$ and $R_i^*=h(Q_i)$, and verifies whether $R_i^*$ and stored $R_i$ in the smart card are equal.

If the values are unequal, the smart card rejects the login procedure; if the values are equal, the legitimacy of the user $U_i$ is ensured, and the messages stored in the smart card can be read by the user $U_i$.

The user $U_i$ freely chooses a new user password $PW_i^{new}$ and generates a new random number $r_i^{new}$.

The smart card computes $B_i^{new}=Q_i\oplus h(ID_i\|h(r_i^{new}\oplus PW_i^{new}))$, $PTC_i^{new}=PTC_i\oplus h(r_i\oplus PW_i)\oplus h(r_i^{new}\oplus PW_i^{new})$.

The smart card replaces an original parameter set $\{PTC_i^{new}, B_i^{new}, r_i^{new}\}$ with a new parameter set $\{PTC_i, B_i, r_i\}$, and the smart card has a secret parameter set $\{ID_{GWN}, PTC_i^{new}, TE_i, B_i^{new}, R_i, r_i^{new}, h(.)\}$.

The aforementioned $B_i^{new}$, $PTC_i^{new}$ are computation values.

The anonymity authentication method for wireless sensor networks of the present disclosure has higher security than the conventional authentication methods. The detail descriptions are provided as follows.

(a) Password protection, guessing attack resistance and stolen smart card attack resistance.

The anonymity authentication method for wireless sensor networks of the present disclosure can prevent leakage of the password thereby preventing leakage of important data. An adversary cannot perform an off-line password guessing attack to obtain important data. A stolen smart card attack means that when a smart card is lost or the adversary steals it from the user, the adversary can masquerade as a legitimate user to login to the gateway node GWN through the secret data in the smart card. In the present disclosure, the password is presented in a form of a hash function $h(r_i\oplus PW_i)$, at the time, the random number $r_i$ and the user password $PW_i$ are hidden, and the hash function $h(r_i\oplus PW_i)$ is not stored in the smart card, the gateway node GWN or the other devices. Therefore, the adversary cannot perform an off-line password guessing attack to the hash function $h(r_i \oplus PW_i)$ to obtain the real password.

(b) Two-factor security.

In the anonymity authentication method for wireless sensor networks of the present disclosure, the original user identification $ID_i$, the user password $PW_i$ and the messages stored in the smart card are required for completing the mutual authentication. The adversary cannot login to the system and cannot be authenticated by the system only by extracting the messages from the smart card or only by obtaining the user password $PW_i$. Therefore, when the smart card of the user $U_i$ or the user password $PW_i$ is stolen, the security of the scheme is guaranteed; however, if they are both stolen, it cannot guarantee security.

(c) Masquerade attack resistance and replay attack resistance.

In the anonymity authentication method for wireless sensor networks of the present disclosure, the user identification $ID_i$ and the user password $PW_i$ are inputted to the smart card for mutual authentication. In the conventional authentication methods, the login messages during verifying may be obtained without requiring the user password $PW_i$, therefore, masquerade attacks are easily occurred. However, through the anonymity authentication method for wireless sensor networks of the present disclosure, the adversary cannot masquerade as a legitimate user $U_i$ or a legitimate gateway node GWN when the smart card is lost. Therefore, the security can be ensured.

(d) Stolen verifier attack resistance and insider attack resistance.

In the present disclosure, the gateway node GWN and the sensor node $S_j$ don't need to maintain a verification table. Furthermore, when the user $U_i$ is registered to the gateway node GWN, a hash value obtained from performing a hash operation to the user password $PW_i$ and the random number $r_i$ is used, rather than directly using the user password $PW_i$. The hash value is also not stored in the gateway node GWN. Therefore, the gateway node GWN doesn't know the user password $PW_i$, and the adversary cannot perform the off-line password guessing attack.

(e) Password updating, freely chosen password, adding new user functionality, and time synchronization.

In the present disclosure, a new user $U_i$ can freely choose its user identification $ID_i$ and the user password $PW_i$ without the assistance of the gateway node GWN; therefore, the new user $U_i$ can be easily added. Furthermore, the timestamp is not used in the present disclosure; therefore, time synchronization problem in the conventional wireless sensor networks can be solved.

(f) Mutual authentication and session key agreement.

In the present disclosure, the mutual authentication between the user $U_i$, the gateway node GWN and the sensor node $S_j$ can be effectively performed, and the session key can be easily established.

(g) User anonymity.

In the present disclosure, the user identification $ID_i$ can only be obtained by a specified service provider, and cannot be obtained by the others. Furthermore, the transmitted messages are encrypted by the random number $r_i$, therefore the anonymity can be achieved, and the adversary cannot trace the user $U_i$.

(h) Gateway bypassing attack resistance and gateway spoofing attack resistance.

In the present disclosure, the adversary cannot obtain the message set $m_2$ through obtaining $q_2$ because the temporal credential $TC_j$ cannot be obtained by the adversary. Thus, the adversary cannot bypass the gateway GWN to forge the message set $m_2$ to the sensor node $S_j$. Without the message set $m_2$, the sensor node $S_j$ cannot respond with any other messages. Similarly, when the adversary attempts to impersonate the gateway GWN to obtain the private login information of the user $U_i$, the adversary cannot obtain K because the temporal credential $TC_j$ cannot be obtained. Therefore, the adversary cannot obtain the message set $q_3$ and cannot transmit the message set $m_3$ to the user. Therefore, the adversary cannot spoof a legitimate gateway node in the system, and the gateway spoofing attack can be resisted.

Compared to the conventional authentication methods, the anonymity authentication method of the present disclosure not only has higher security, but also has higher computational efficiency and functionality. The following TABLE 1 demonstrates the computational efficiency, and the TABLE 2 demonstrates the functionality. Here the computational efficiency can be divided into the computational cost and the communication cost.

In the anonymity authentication method of the present disclosure, four procedures are involved: the registration procedure, the login procedure, the authentication and key agreement procedure and the password changing procedure. The demonstration of the computational efficiency is mainly focused on the authentication and key agreement procedure.

In TABLE 1, the computational cost and the communication cost of each step on the authentication and key agreement procedure are showed. Commonly the computational cost for the XOR operation is very low and can be ignored. In the conventional authentication procedure, in addition to the XOR operator and the hash function operation, an eclipse function encrypt/decrypt operation is also used; therefore, the cost is higher than the authentication procedure of the present disclosure. In TABLE 1, $T_h$ and $T_{ecc}$ represents the hash function operation and the eclipse function encrypt/decrypt operation respectively.

Furthermore, a time complexity of the hash function is $O(1)$, therefore, the anonymity authentication method of the present disclosure is very simple.

Concerning to the communication cost, as showed in TABLE 1, only four message transmitting rounds are used in the anonymity authentication method of the present disclosure. Therefore, the anonymity authentication method for wireless sensor networks of the present disclosure has low communication cost and high computational efficiency.

TABLE 1

| | Present disclosure | conventional art | | | | |
|---|---|---|---|---|---|---|
| | | 1 | 2 | 3 | 4 | 5 |
| authentication procedure computational cost | | | | | | |
| user | 4Th | 5Th | 2Tecc + 1Th | 3Th | 4Th | 3Th |
| gateway node | 8Th | 11Th | 4Tecc + 3Th | 5Th | 5Th | 4Th |
| sensor node | 3Th | 3Th | 2Tecc + 2Th | 2Th | 2Th | 1Th |
| key agreement procedure computational cost | | | | | | |
| user | 3Th | 3Th | 1Th | —* | —* | —* |
| gateway node | 3Th | 3Th | 1Th | —* | —* | —* |
| sensor node | 3Th | 3Th | 1Th | —* | —* | —* |
| communication cost (authentication and key agreement procedure) | | | | | | |
| transmitted message | 4 | 4 | 3 | 4 | 4 | 3 |
| energy consumption | low | low | high | low | low | low |

*The conventional arts 3, 4 and 5 schemes do not provide key agreement phase.

The following TABLE 2 demonstrates the functionalities of the anonymity authentication method of the present disclosure.

TABLE 2

| functionality | present disclosure | conventional art | | | | |
|---|---|---|---|---|---|---|
| | | 1 | 2 | 3 | 4 | 5 |
| password protection | yes | no | yes | yes | no | no |
| stolen smart card attack resistance | yes | no | no | no | no | no |
| masquerade attack resistance | yes | yes | yes | yes | no | no |
| relay attack resistance | yes | yes | no | yes | yes | yes |
| insider attack resistance | yes | no | yes | yes | no | no |
| password changing | yes | no | no | yes | no | no |
| mutual authentication | yes | yes | yes | yes | yes | no |
| session key agreement | yes | yes | yes | no | no | no |
| user anonymity | yes | yes | no | yes | yes | yes |
| gateway bypassing attack resistance | yes | yes | yes | no | no | no |

From above TABLE 2, it is shown that the conventional arts don't have the functionality on the stolen smart card attack resistance. The anonymity authentication method also has the functionalities on the masquerade attack resistance and the insider attack resistance and can solve the insecurity problem of the conventional arts.

The anonymity authentication method of the present disclosure is performed through the smart card of the user, and can provide two-factor protection. Therefore, higher security and computational efficiency can be achieved.

The anonymity authentication method of the present disclosure can block various kinds of attacks and provide higher security during message transmission. Moreover, the anonymity authentication method of the present disclosure uses simple algorithm. Therefore, the anonymity authentication method for wireless sensor networks of the present disclosure has high security, high efficiency and high better functionalities.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A computer-implemented anonymity authentication method for wireless sensor networks, wherein the wireless sensor networks comprise smart cards, card readers, sensor nodes and gateway nodes inter-connected between the smart cards and the sensor nodes, the smart cards are physical cards carried by a user, the sensor nodes are physical detectors that monitor physical or environmental conditions, the gateway nodes are physical nodes that are communicated between the sensor nodes and the smart cards, and the smart cards are read by the card readers, the anonymity authentication method comprising a registration procedure executed with a processor, a login procedure executed with a processor and an authentication and key agreement procedure executed with a processor, the registration procedure comprising a user registration procedure and a sensor node registration procedure, the user registration procedure comprising:

freely choosing a user identification $ID_i$ and a user password $PW_i$ by a user;

generating a random number $r_i$, and computing $h(r_i \oplus PW_i)$ by the user, where $h(.)$ is a single hash function operation;

transmitting the user identification $ID_i$ and $h(r_i \oplus PW_i)$ to a gateway node by the user through a security channel;

selecting an expiration time $TE_i$ of a temporal credential $TC_i$ of the user $U_i$ and computing: $P_i=h(ID_i\|ID_{GWN}\|TE_i)$, $TC_i=h(P_i\|K_{GWN-U}\|TE_i)$, $PTC_i=TC_i \oplus h(r_i \oplus PW_i)$, $Q_i=h(ID_i\|K_{GWN-U})$, $B_i=Q_i \oplus h(ID_i\|h(r_i \oplus PW_i))$ and $R_i=h(Q_i)$ by the gateway node, and issuing the temporal credential $TC_i$ for the user $U_i$ after receiving the messages transmitted by the user $U_i$, where $\|$ is a string concatenation operation and $\oplus$ is an XOR operation;

issuing a secret parameter set $\{ID_{GWN}, PTC_i, TE_i, B_i, R_i, h(.)\}$ to the smart card of the user by the gateway node through a security channel; and inputting the random number $r_i$ to the smart card of the user, and the smart card comprising a secret parameter set $\{ID_{GWN}, PTC_i, TE_i, B_i, R_i, r_i, h(.)\}$;

the sensor node registration procedure comprising:

pre-configuring a sensor node with a sensor node identification $SID_j$;

generating a random number $r_j$ and computing $h(r_j \oplus SID_j)$ by the sensor node;

transmitting the sensor node identification $SID_j$ and $h(r_j \oplus SID_j)$ to the gateway node by the sensor node through a security channel;

computing a temporal credential $TC_j=h(K_{GWN-S}\|SID_j)$ and issuing the temporal credential $TC_j$ for the sensor node by the gateway node after receiving the messages transmitted from the sensor node;

computing $RTC_j=TC_j \oplus h(h(r_j \oplus SID_j)\|SID_j)$ and transmitting $RTC_j$ to the sensor node by the gateway node through a security channel; and computing the temporal credential $TC_j = RTC_j \oplus h(h(r_j \oplus SID_j)\|SID_j)$ then storing $TC_j$ by the sensor node after receiving the messages transmitted from the gateway node;

the login procedure comprising:

inserting the smart card into the card reader by the user and providing the user identification $ID_i$ and the user password $PW_i$ corresponding to the smart card;

computing $Q_i=B_i \oplus h(ID_i\|h(r_i \oplus PW_i))$ and $R_i^*=h(Q_i)$ by the smart card, and verifying whether $R_i^*$ and stored $R_i$ in the smart card are equal;

if the values are unequal, the smart card rejecting the login procedure; if the values are equal, the legitimacy of the user is ensured, and the messages stored in the smart card being read by the user; and computing the temporal credential $TC_i=PTC_i \oplus h(r_i \oplus PW_i)$ by the user to find the temporal credential $TC_i$;

the authentication and key agreement procedure comprising:

generating a random number $N_i$ and computing: $P_i=h(ID_i\|ID_{GWN}\|TE_i)$, $DID_i=ID_i \oplus h(TC_i\|ID_{GWN}\|N_i)$ and $q_1=h(ID_i\|TC_i\|N_i)$ by the user;

randomly choosing a secret sharing key $K_i$, and computing $PKS_i=K_i \oplus h(TC_i\|N_i)$ by the user; after computation, transmitting a login request message $m_1=\{DID_i, q_1, PKS_i, TE_i, P_i, N_i\}$ to the gateway node by the user;

computing $TC_i=h(P_i\|K_{GWN-U}\|TE_i)$, $ID_i=DID_i \oplus h(TC_i\|ID_{GWN}\|N_i)$ and $q_1^*=h(ID_i\|TC_i\|N_i)$ by the gateway node after receiving the login request message;

verifying whether $q_1^*$ and $q_1$ are equal by the gateway node; if $q_1^* \neq q_1$, terminating the login request of the user and transmitting a rejection message to the user by the gateway node; if $q_1^*=q_1$, the legitimacy of the user is ensured, and the login request of the user is acceted by the gateway node and a login status of the user is recorded by the gateway node;

computing $K_i=PKS_i \oplus h(TC_j \| N_i)$ by the gateway node; at the time, choosing a nearby suitable sensor node as the accessed sensor node with the sensor node identification $SID_j$ and computing the temporal credential $TC_j=h(K_{GWN-S} \| SID_j)$ by the gateway node;

generating a random number $N_{GWN}$ and computing $DID_{GWN}=ID_i \oplus h(TC_j \| DID_i \| N_{GWN})$, $q_2=h(ID_i \| TC_j \| N_{GWN})$ and $PKS_{GWN}=K_i \oplus ((TC_j \| N_{GWN})$ by the gateway node;

after computation, transmitting a message set $m_2=\{DID_i, DID_{GWN}, q_2, PKS_{GWN}, ID_{GWN}, N_i, N_{GWN}\}$ to the sensor node by the gateway node;

after receiving the message set, assessing the gateway node identification $ID_{GWN}$ to determine whether the gateway node is an ally, if yes, then computing $ID_i=DID_{GWN} \oplus h(TC_j, DID_i \| N_{GWN})$ and $q_2^*=h(ID_i \| TC_j \| N_{GWN})$ by the sensor node;

verifying whether $q_2^*$ and $q_2$ are equal by the sensor node, if $q_2^* \neq q_2$, terminating the request and returning a rejection message by the sensor node; if $q_2^*=q_2$, the legitimacy of the gateway node is ensured, and the request is accepted by the sensor node;

at the time, computing $K_i=PKS_{GWN} \oplus h(TC_j \| N_{GWN})$ by the sensor node;

freely choosing a secret sharing key $K_j$ and computing $q_3=h(ID_i \| SID_j \| K_i \| N_i \| N_{GWN})$ and $PKS_j=K_j \oplus h(K_i \| N_i \| N_{GWN})$ by the sensor node;

transmitting a message set $m_3=\{SID_j, q_3, PKS_j, N_i, N_{GWN}\}$ to the user and the gateway node by the sensor node;

after receiving the message set $m_3$, the user and the gateway node computing $q_3^*=h(ID_i \| SID_j \| K_i \| N_i \| N_{GWN})$ separately;

after computation, verifying whether $q_3^*$ and $q_3$ are equal by the gateway node; if $q_3^*=q_3$, the legitimacy of the sensor node is ensured by the gateway node;

verifying whether $q_3^*$ and $q_3$ are equal by the user, if $q_3^*=q_3$, the legitimacy of the sensor node and the gateway node is ensured by the user;

the user and the gateway node computing the secret sharing key $K_j=PKS_j \oplus h(K_i \| N_i \| N_{GWN})$ separately;

after the authentication procedure, the user, the gateway node and the sensor node computing a shared secret session key $KEY_{i,j}=h(K_i \| K_j \| N_i \| N_{GWN} \| SID_j)$ separately, and the shared secret session key $KEY_{ij}$ is used to encrypting/decrypting the messages among the user, the gateway node and the sensor node;

wherein $P_i$, $PTC_i$, $Q_i$, $B_i$, $R_i$, $RTC_j$, $PKS_i$, $PKS_{GWN}$, $PKS_j$, $q_1^*$, $q_1$, $q_2^*$, $q_2$, $q_3^*$, $q_3$, $R_i$, $R_i^*$ are computation values.

2. The computer-implemented anonymity authentication method of claim 1, further comprising a password changing procedure, the password changing procedure comprising:

inserting the smart card into the card reader and providing the user identification $ID_i$ and the user password $PW_i$ by the user;

computing $Q_i=B_i \oplus h(ID_i \| h(r_i \oplus PW_i))$ and $R_i^*=h(Q_i)$ by the smart card of the user, and verifying whether $R_i^*$ and stored $R_i$ in the smart card are equal;

if the values are unequal, the smart card rejecting the login procedure; if the values are equal, the legitimacy of the user is ensured, and the messages stored in the smart card can be read by the user;

freely choosing a new user password $PW_i^{new}$ and generating a new random number $r_i^{new}$ by the user;

computing $B_i^{new}=Q_i \oplus h(ID_i \| h(r_i^{new} \oplus PW_i^{new}))$, $PTC_i^{new}=PTC_i \oplus h(r_i \oplus PW_i) \oplus h(r_i^{new} \oplus PW_i^{new})$ by the smart card; and replacing a original parameter set $\{PTC_i^{new}, B_i^{new}, r_i^{new}\}$ with a new parameter set $\{PTC_i, B_i, r_i\}$ by the smart card, and the smart card comprising a secret parameter set $\{ID_{GWN}, PTC_i^{new}, TE_i, B_i^{new}, R_i, r_i^{new}, h(.)\}$;

wherein $B_i^{new}$, $PTC_i^{new}$ are computation values.

3. The computer-implemented anonymity authentication method of claim 1, wherein the gateway node is a computer with a storage functionality.

4. The computer-implemented anonymity authentication method of claim 1, wherein the smart card is a multifunctional chip card.

* * * * *